July 2, 1957     E. WINER     2,797,447
PANEL CONSTRUCTION
Filed Dec. 31, 1952

INVENTOR
Ephraim Winer

BY Karl W. Flocks
ATTORNEY

United States Patent Office 2,797,447
Patented July 2, 1957

2,797,447

PANEL CONSTRUCTION

Ephraim Winer, Baltimore, Md., assignor to The National Plastic Products Company, Odenton, Md., a corporation of Maryland Application December 31, 1952, Serial No. 329,051

5 Claims. (Cl. 20—15)

The present invention relates to a panel construction. More particularly, the present invention relates to a panel assembly in which a laminated top sheet and a cellular core construction are incorporated therein. Panel constructions utilizing a laminated plastic top and a suitable edging therefor have become familiar in everyday use in the home, restaurant, and office. These plastic panels are not only employed in table tops for kitchen and restaurant use, but are utilized in various type door constructions and are contemplated for use in the present invention as doors for kitchen cabinets. The plastic top panel constructions have the advantage over wood and metal doors of being heat and wear resistant, eliminating the necessity of periodic painting and re-surfacing and are available to the public at relatively low cost.

Prior to the instant invention, the heretofore known panel constructions that incorporated laminated plastic top surfaces utilized a wood or plywood core or a combination of a wood and metal core. The heretofore known panel constructions also employed an edging that had to be securely fastened to the panel and therefore wood frame members were added at the borders of the panel and served as outer margins therefor. A backing sheet completed the panel construction. These heretofore known panel constructions were found to be undesirable due to the fact that the wood cores and frame members and backing sheet materially increased the weight of the panel. Moreover, the time consuming techniques necessary in assembling the panel elements increased the overall cost of the panel construction.

The present invention not only eliminates the assembly problem ordinarily associated with laminated top panel constructions, but provides a panel that is light in weight, waterproof, warp-proof and durable in construction. The panel described herein is constructed from a one-piece sheet of molded thermoplastic material that is formed in a cellular construction and that is provided with an edging which is applied directly to the core, as will hereinafter be described.

It is an object of the present invention to provide a panel construction that is waterproof, warp-proof, light in weight and durable.

It is another object of the present invention to provide a panel that includes a thermoplastic molded core construction therein.

Another object of the present invention is to provide a panel in which the molded core is formed in a cellular construction.

Still another object of the present invention is to provide a panel construction incorporating a cellular core which includes an edging applied directly thereto.

Still another object of the present invention is to provide a panel construction incorporating a cellular core whereby the panel is employed as a table top.

Still another object of the present invention is to provide a panel construction incorporating a cellular core whereby the panel is employed in a door assembly.

Still another object of the present invention is to provide a panel construction which includes a thickened laminated top sheet secured to a cellular core.

Other objects and the nature and advantages of the instant invention will be apparent from the following description taken in conjunction with the accompanying drawings, wherein.

The panel described in the present invention includes a core that is formed in a one-piece sheet by injection molding. The configuration of the panel may be round, square or rectangular, or any other desired shape depending upon the configuration of the table to be covered, or door to be employed. The core is formed from a suitable thermoplastic material that may be easily injection molded in a cellular construction, as will hereinafter be described.

Figure 1:
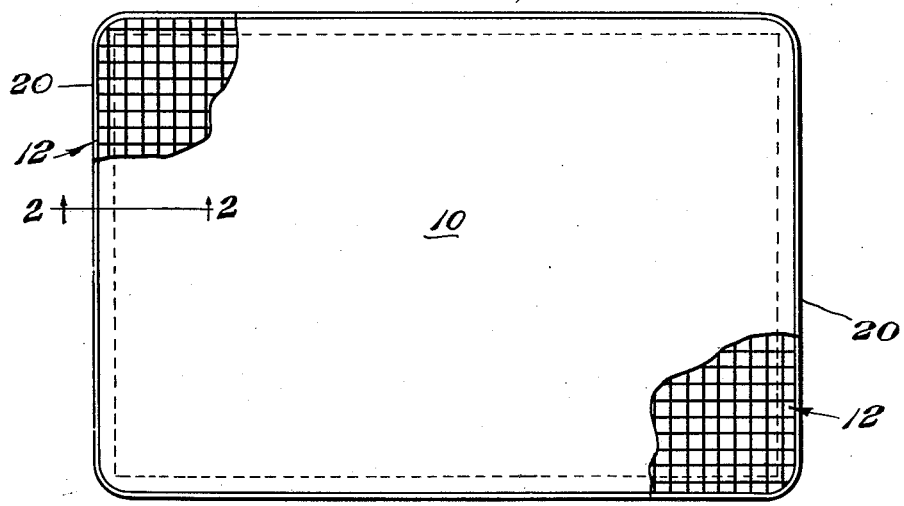
Fig. 1 is a plan view with parts broken away of a panel construction embodied in one form of the present invention.
Figure 2:
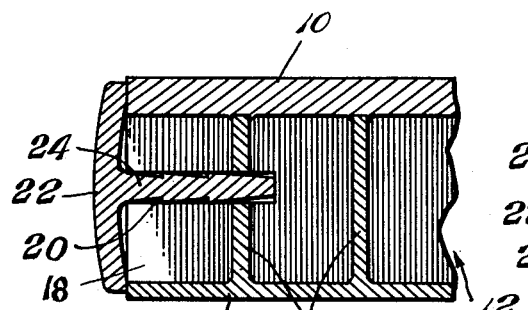
Fig. 2 is a sectional view taken along the line 2—2 of Fig. 1.
Figure 3:
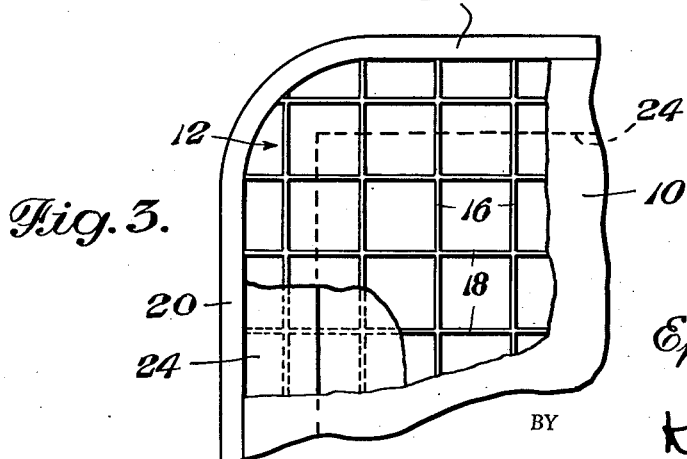
Fig. 3 is an enlarged view of the corner construction of the panel illustrated in Fig. 1.

Referring to the drawings, and particularly Figs. 1–3, one form of the panel construction embodied in the present invention is illustrated and includes a top sheet 10 having a rectangular configuration. The top sheet 10 can be made of metal or wood veneer, but is preferably fabricated from laminated paper which has been impregnated with thermosetting resin and compression molded into a plastic sheet under high pressure and at the required temperature. Referring to Fig. 2, the top sheet 10 is shown having a cross-section which is greater than that normally employed in laminated table tops, the purpose of which will be more fully described hereinafter.

The top sheet 10 is secured to a cellular core generally indicated at 12 by a waterproof adhesive. The core 12 is formed by injection molding a thermoplastic material into the rectangular configuration corresponding to the top sheet 10. As shown in Figs. 2 and 3, the core 12 comprises a base 14 and a plurality of vertically extending walls 16 and 18 integrally joined to the base 14. The vertically extending walls 16, 18 intersect at right angles and form a series of cells or cavities which extend along the entire upper surface of the core 12. The open sides of the cells are sealed by the top sheet 10 which contacts the uppermost portion of each of the walls 16, 18 and is secured thereto by the waterproof adhesive. Since the top sheet 10 is not supported along the entire under surface, but only along the areas defined by the topmost portions of the vertically extending walls 16, 18, there is a tendency for the unsupported areas of the top sheet 10 to sag. Unless the top sheet 10 is of sufficient strength or thickness, to prevent the sagging effect, the vertical walls 16, 18 will cause a slight indentation on the under surface of the top sheet which will show up as a surface effect on the upper surface thereof. In order to eliminate any possibility of a surface effect, the laminated top sheet 10 is fabricated of a sufficient thickness and strength to withstand any sagging of the unsupported areas of the top sheet 10. However, the top sheet 10 cannot be too thick so as to be unwieldy and costly to construct. Practical experience has proven that top sheets having a thickness measuring 1/32 of an inch and below are of insufficient thickness when positioned over the open celled side of a core to prevent the walls of the core from showing through as a surface effect. Top sheets measuring from above 1/32 of an inch to 3/32 of an inch in thickness have been found satisfactory for prescribed purposes. A top sheet for use with a table assembly, for instance, measuring 3/32 of an inch in thickness, is more than sufficient to prevent any surface effects. Therefore, it is apparent from the above that the laminated top sheets utilized in the present invention can vary between the limits of $\frac{1}{32}$ and $\frac{3}{32}$ of an inch in thickness, depending upon the end use of the panel.

Formed in the outside wall of the cellular core 12 and extending around the entire periphery of the core is a horizontally extending slot or kerf 20. The kerf 20 receives a T-shaped edging 22 which includes a leg 24 formed integral therewith. The edging 22, which is formed from a strip of thermoplastic material, suitably covers the outside edge of the core 12 and extends from the topmost portion of the top sheet 10 to the bottommost portion of the base 14. A waterproof adhesive is applied along the inner side of the edging 22 to firmly secure the edging to the outer edges of the vertical walls, to the top sheet 10, and to the base 14. It is apparent that by forming the cellular core 12 with the kerf 20 and suitably securing the edging 22 thereon, wooden frame members generally employed in the heretofore known panel constructions are obviated. Thus, the present invention not only eliminates the heavy plywood or wood core, but also eliminates the use of frame members, thereby considerably decreasing the weight and the cost of the panel construction.

In assembling the panel construction described hereinabove, the cellular core 12 formed by injection molding is machined to form the kerf 20 along the outer edges thereof. The top 10 is then secured to the open celled side of the core by means of a suitable adhesive and the required pressure. The assembly is completed by applying the edging 22 along the edge of the core, the leg 24 of the edging 22 fitting in the kerf 20.

Figure 4:
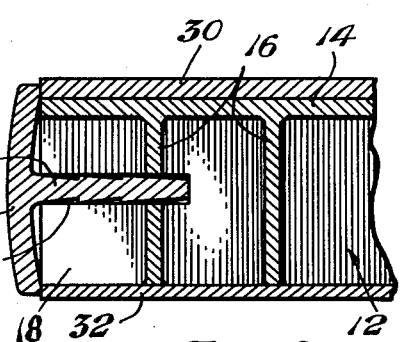
Fig. 4 is a vertical sectional view of a modified form of the panel construction illustrated in Figs. 1–3.

Referring now to Fig. 4, a modified form of the present invention is illustrated and includes a core 12 of the type described hereinabove. The core 12 is employed in the reverse position, the base 14 being utilized as the top of the core. Since the base 14 defines the top of the core, the dimensions of the top sheet are not critical. Therefore, a relatively thin laminated top sheet 30 is secured to the portion 14 which, in effect, reduces the overall weight of the panel. In the construction shown in Fig. 4, a thin backing sheet 32 of any suitable material may be employed and is applied over the celled side of the core 12 and secured thereto by a suitable adhesive. The backing sheet 32 is formed from a relatively light-weight and less costly material than the laminated top 30 and thus when assembled with the top sheet 30 and core 12 provides a construction that is inexpensive, light in weight, yet strong and durable. The edging 22 is applied to the core around the edge thereof, as described hereinabove, the leg 24 being received by the horizontally extending kerf 20.

It is apparent from the foregoing that the panels described in the instant invention are not only strong and durable, waterproof and warp-proof, but are light in weight, easy to handle and attractive in appearance. The molded cores are manufactured by injection molding which requires no special materials or treatment of materials, as is heretofore known in wood and plywood panels. Furthermore, special hardware fittings are not required in the assembly of the panel, a waterproof adhesive and pressure being more than adequate to firmly secure the core, top sheet and edging together. The assembled panel, in addition to being a strong and durable construction, has excellent soundproof characteristics due to the cellular formation of the core. This is particularly significant when the panel is used as a dining table top in restaurants or in the home. The strength of the panel construction in the embodiment illustrated in Figs. 1–3 is increased by employing a top sheet which is relatively thicker than normal. The thickened top sheet not only increases the overall strength and durability of the panel construction, but prevents the vertical walls of the cellular core from showing through on the surface of the top sheet. The dimension of the thickness of the top sheet is critical in this construction, the desirable thickness for a table top measuring approximately $\frac{3}{32}$ of an inch. Top sheets having a greater thickness prohibitively increase the weight of the panel while, if a top sheet is utilized having a thickness of approximately $\frac{1}{32}$ of an inch or less, the vertically extending walls of the core have a tendency to form indentations on the under surface of the panel, which results in surface effects on the upper surface of the panel. Panels utilized for other purposes than table tops, can utilize top sheets having a thickness varying between the critical limits of $\frac{1}{32}$ and $\frac{3}{32}$ of an inch. The panel illustrated in Fig. 4 eliminates the need for a thicker top sheet, but requires an additional sheet to seal the cellular core. The panel employing this construction is very light in weight due to the thinner top sheet, but also provides an assembly that is strong and durable and adaptable for many purposes.

It will be obvious to those skilled in the art that various changes may be made without departing from the spirit of the invention and, therefore, the invention is not limited to what is shown in the drawings and described in the specification but only as indicated in the appended claims.

What is claimed is:

1. In a panel construction, a molded core formed of a thermoplastic material, said core including a base and a plurality of walls molded integral with said base and located in perpendicular relation with respect thereto, said base and walls thereby forming a light-weight cellular structure, a slot formed in the edge of said cellular core, an edging extending around the periphery of said cellular core and having an adhesive applied thereto, said edging being positioned in said slot and firmly secured therein by said adhesive, and an outer sheet of laminated thermosetting material positioned on said cellular core and secured to the outer edges of said walls, thereby forming an outer surface of said panel construction.

2. In a panel construction as set forth in claim 1, wherein said outer sheet has a cross section that is relatively greater than said base or walls, said large outer sheet thereby increasing the strength of said panel construction and preventing surface undulations thereon due to contact thereof with said walls.

3. In a panel construction, a molded core formed of a thermoplastic material, said core including a base, a plurality of walls molded integral with said base and located in perpendicular relation with respect thereto, said walls being defined by a first series of parallel walls and a second series of parallel walls extending at right angles to said first series, said first and second series of walls forming with said base a cellular structure having an exposed side, a slot formed along the outer edge of said cellular structure, an edging of thermoplastic material having a leg extending into said slot thereby securing said edging to said cellular structure, and an outer sheet of laminated thermosetting material positioned on said cellular core and secured to the outer edges of said walls, said sheet thereby forming an outer surface of said panel construction.

4. In a panel construction as set forth in claim 3, wherein said slot in said cellular structure extends through the wall immediately adjacent the outer edge of said core.

5. In a panel construction as set forth in claim 3, wherein an adhesive is applied to the leg of said edging for firmly securing said leg in said slot.

References Cited in the file of this patent

UNITED STATES PATENTS

| | | |
|---|---|---|
| 1,002,132 | Brown | Aug. 29, 1911 |
| 1,765,255 | Banta | June 17, 1930 |

(Other references on following page)

UNITED STATES PATENTS

| | | |
|---|---|---|
| 2,173,808 | Kellogg | Sept. 19, 1939 |
| 2,189,813 | McGuire | Feb. 13, 1940 |
| 2,445,290 | Gonda | July 13, 1948 |
| 2,630,604 | Marsh, Sr. | Mar. 10, 1953 |
| 2,705,820 | Torrence | Apr. 12, 1955 |

FOREIGN PATENTS

| | | |
|---|---|---|
| 750,371 | France | May 22, 1933 |
| 467,671 | Great Britain | June 16, 1937 |
| 202,814 | Switzerland | May 1, 1939 |

OTHER REFERENCES

Scientific American, page 80, February 1942.